Feb. 6, 1962 E. S. LINDAU 3,019,697
FILM STOPPING MECHANISM FOR CAMERAS
Filed Oct. 1, 1958 2 Sheets-Sheet 1

Inventor.
Eric S. Lindau.
By Hill & Hill Attys.

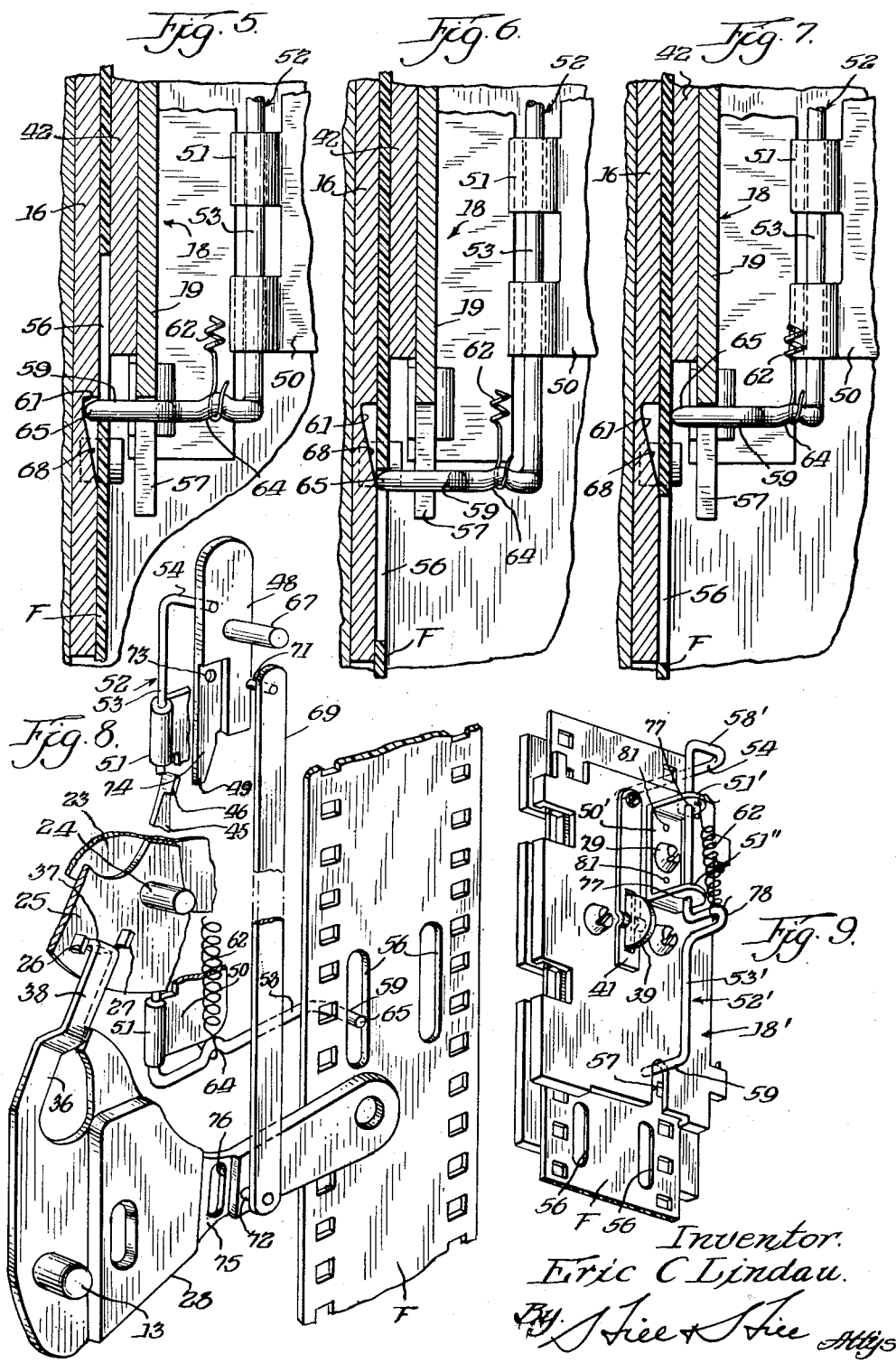

United States Patent Office 3,019,697
Patented Feb. 6, 1962

3,019,697
FILM STOPPING MECHANISM FOR CAMERAS
Eric S. Lindau, 676 Western Ave., Lake Forest, Ill.
Filed Oct. 1, 1953, Ser. No. 764,635
7 Claims. (Cl. 88—16)

The invention relates generally to photographic cameras and more particularly to control means therefor.

In loading cameras with film it is necessary to first thread the film through the film advancing mechanism with the camera in an open position; second, close the camera and advance sufficient film to bring the latter to a starting point. Generally, this involves a pure guess, which may be aided, to some extent by film counters and the like, although many counters are designed to be set after completing loading, and in most cases, such counters are relatively inaccurate.

In the case of movie cameras, film may be wasted in process and it is a common experience to find that a picture sequence has been cut short or lost at the end of the film, because of the lack of realization that the end had been reached until the film was out etc.

The present invention is directed to a structure whereby the operator may accurately determine when a fresh film has been adequately threaded through the mechanism and, if desired, when the entire usable length of film has been exposed, and has among its objects the production of such a structure which is simple, fool-proof and very efficient for the purposes intended.

Another object of the invention is the production of such a structure which may be actuated by the film itself and which, if desired, may be controlled by the same manually actuated mechanism that controls the film advance. Thus, in the case of movie cameras, the manual start and stop button may be employed to also control the operation of the present invention.

Another object of the invention is the production of such a film control mechanism which is of particular use in movie cameras wherein the film is reversed to form a double row of exposures whereby all usable film from one end to the other may be exposed without the element of chance or guesswork.

A further object of the invention is the production of such a film control device which may be readily incorporated in current types of cameras without extensive change in the design of the operating mechanism thereof.

A further object of the invention is the production of novel film construction for use in my improved camera structure.

Many other objects and advantages of the present invention will be obvious to those skilled in the art from the disclosure herein given.

In the drawings wherein like reference characters indicate like or corresponding parts:

FIG. 5 is a sectional view taken approximately on the line 5—5 of FIG. 3;

FIG. 6 is a sectional view similar to FIG. 5, illustrating a changed position;

FIG. 7 is a sectional view similar to FIG. 5, illustrating a second changed position;

FIG. 8 is a perspective view of only the actuating linkage illustrated in FIGS. 3 to 7; and FIG. 9 is a perspective view of a film gate illustrating a modified construction of the invention.

Figure 1:
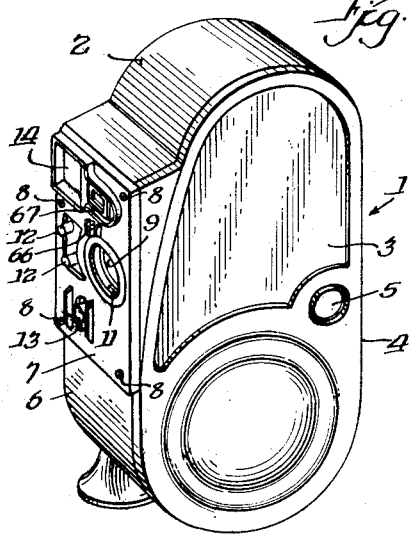
FIG. 1 is a perspective view of a movie camera embodying the invention, the lens structure being omitted.

It will be appreciated that both still and movie camera design vary widely with respect to location, arrangement, size and shape of component parts of film advancing and shutter structures, as a result of which each type and make of camera may necessitate variation in the design of the components of the present invention, to permit their adaptation to the particular structure involved. Likewise, while I have illustrated the invention in connection with a movie camera, those skilled in the art will be able to readily determine a suitable structure for any specific camera construction.

The particular embodiment of the invention illustrated in the drawings is constructed to stop advancement of the film, irrespective of actuation of a manual control button or member, in which such film stopping mechanism may be released by the further actuation of the control button. In such case, the sequence of operation may be as follows:

Following threading of the film and closure of the camera, the film advancing button may be actuated to start the film advance, which will continue until the start of the portion to be exposed is reached. At such point, the advance of the film will be automatically stopped, irrespective of the fact that the control button is in a film advancing position. Control of the film advance may then be returned to the manual control button by moving the latter to its "stop" or "off" position which will release the automatic mechanism, following which the camera will function in the usual manner until the end section of the film is reached.

By providing automatic stopping at the end of the film, exposure of all available film may be achieved and immediate indication is given to the operator when exposure is completed.

Referring to the drawings, and more particularly to FIGS. 1 through 4, the reference numeral 1 indicates generally a movie camera of a commercially procurable type comprising a housing 2, one side 3 of which is hinged along the edge 4 and retained in a normally closed position by a latch mechanism, not shown, which is actuated by a manually slidable button 5.

The housing is also provided with a front wall 6, a part of which comprises a removable front plate 7 secured to the housing by four screws 8. The plate 7 is provided with a socket 9 adapted to receive a lens assembly, not shown, which would be retained in operative position by a latch mechanism 11 having a pair of actuating levers 12, by means of which removal or insertion of the lens assembly may be effected. Extending from the plate 7 is a film advance control button 13 which, in the particular type of camera illustrated, is movable vertically from a central, neutral position, either upwardly or downwardly and constructed to return to the neutral position when released. When in the middle neutral position, the camera is inoperative, and by moving the button downwardly, normal movie operation is obtained, film being advanced as long as the button is held in said position, while single frame exposures can be taken by moving the button upwardly. In such case, the button must be returned to the neutral position before another single frame exposure can be taken. The plate 7 also may be provided with a view finding window 14.

Figure 2:
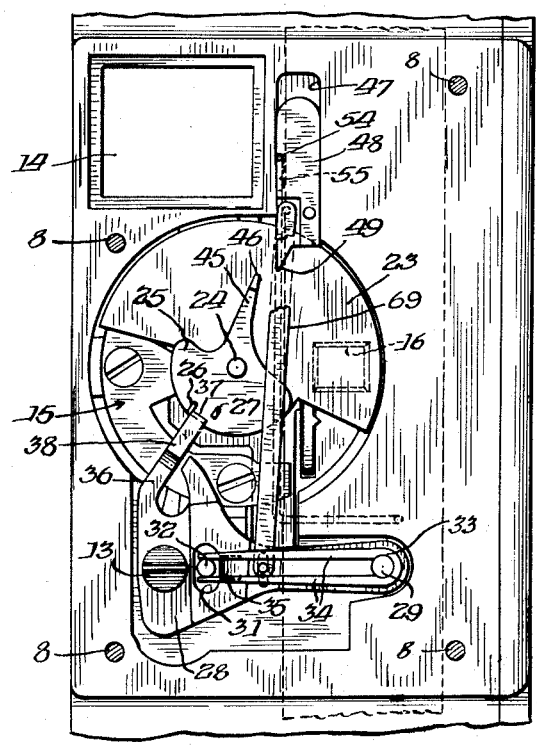
FIG. 2 is a front elevational view of the camera illustrated in FIG. 1 with the front plate thereof removed.

Referring to FIG. 2, which is an enlarged view of the front portion of the camera with the plate 7 removed, the reference numeral 15 indicates generally a shutter mechanism adapted to intermittently cover and uncover the film opening 16.

Positioned behind the opening 16 and the opposite side of the wall 17 is a film gate mechanism indicated generally by the numeral 18 and comprising a movable gate member 19 which is pivotally connected by a hinge 21 to an intermediate or partition wall 22. The film gate and shutter mechanism normally include means for intermittently advancing the film between exposures, the latter means and the shutter thus being synchronized in operation.

However, as the details of the advancing means forms no part of the present invention, such mechanism, for the sake of the drawings, has been omitted from the drawings. Such mechanism normally would be positioned below the shutter, as viewed in FIG. 2, and would include suitable means extending inwardly to engage the film.

Figure 4:
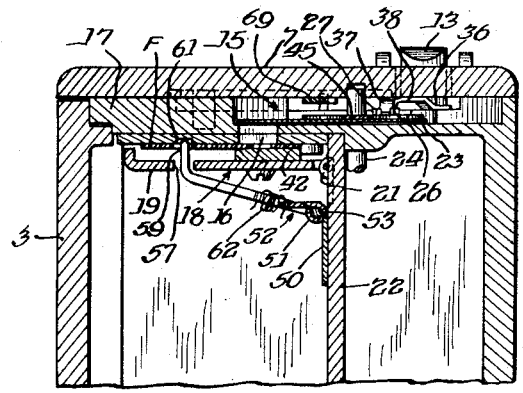
FIG. 4 is a sectional view taken approximately on the line 4—4 of FIG. 3.

As the advancing and shutter mechanisms are interconnected, the stopping mechanism may be associated with the shutter mechanism and in the example illustrated, is operative to engage the shutter. Referring to FIGS. 2 and 4, the shutter mechanism 15 includes a rotatable, semi-circular shutter 23, suitably mounted on and rotatable with a driven shaft 24 journaled in the wall 17 and plate 7, the shutter body having an area of slightly more than half of the circle of generation thereof and of a size to intermittently cover and uncover the film opening 16. The shutter may be provided with a reinforcing and counterbalancing plate 25 having a pair of circumferentially spaced projections 26 and 27. The control button 13 is mounted on a lever 28 which is pivotally mounted on a pin 29 which extends through an aperture in the lever. The latter is also provided with an elongated opening 31 therein, through which extends a second pin 32, the relative proportions of the opening determining the extent of the pivotal movement of the lever 28 about the axis of the pin 29.

As previously mentioned, the arrangement is such that the control button has three positions, a central "off" position, an upper "single frame" position and a lower "movie taking" position. The lever is normally maintained in the "off" position by a hairpin-shaped spring 33 having leg portions 34 extending from the pin 29 to the pin 32 and disposed at opposite sides of the latter. Cooperable with the spring 33 is an upstanding lug or projection 35 on the lever 28 which is disposed between the legs 34 of the spring 33, the latter thus being operative to normally retain the lever in the central "off" position. However, the lever may be moved to either of its other two positions by exerting sufficient pressure on the button 13 to spread the leg 34 opposing such movement, the opposite leg being held from moving in such direction by the pin 32. Carried by and illustrated as being integrally formed with the lever 28 is a projection or finger 36, which extends generally radially with respect to the axis of the shutter 23, and terminating at its free end in a transversely extending portion 37, the intermediate portion of the finger adjacent the portion 37 being offset outwardly as indicated at 38 a sufficient distance to permit the projection 26 to pass thereunder.

The arrangement is such that in the "off" position of the lever 28, the portion 37 will be positioned in the path of and engage the projection 26, as illustrated in FIG. 2. A single frame exposure may be taken by moving the lever 28 upwardly, to move the portion 37 radially inward between the projections 26 and 27 until the portion 37 disengages from the projection 26, at which time the former is in the path of the projection 27. The shutter will therefore make approximately one revolution in a counterclockwise direction until the projection 27 engages the portion 37, thereby stopping the shutter action. Upon return of the lever 28 to the "off" position, the portion 37 is again positioned in the path of the projection 26, returning the shutter to its original starting position. When the lever 28 is moved downwardly, the portion 37 is moved radially outward to permit free rotation of the shutter.

The structure thus far described is one type of generally standard design, and without further mechanism such action would take place from the time the camera is loaded until the end of the film is reached. In such case, the operator loads the camera and then runs off enough film in his opinion, to position unexposed film in operative position, the amount so run may be either too little or too much, resulting in either a loss of the first pictures shot or a waste of good film. The same result may take place at the end of the film.

The gate 18 may be of average construction having a roller 39 operatively mounted on a leaf spring 41 and a film pressure plate 42, and is normally maintained in operative position, as illustrated in FIG. 4 by a member 43 on the cover 3, having a cam portion 44 engageable with the gate when the cover is in closed position.

The construction thus far described is generally typical of conventional camera design and while specific designs may vary, they will all have comparable arrangements.

In the particular embodiment of the invention illustrated in the drawing, the plate 25 is provided with an extension 45 generally oppositely disposed with respect to the lugs or projections 26 and 27 and terminating at its free end in a similar lug or projection 46 which is disposed a greater radial distance from the axis of the shaft 24 whereby the projection 46 will not engage the portion 37 of the member 28 in any of its operative positions. Likewise, the offset portion 38 of the member 28 is of a size to permit the projection 46 to pass freely thereunder. Slidably mounted on the wall 17 in a recess or slot 47 is a latch member 48, the latter being movable toward and away from the path of the projection 46, and is provided with a shoulder 49 adapted, when the member 48 is in its innermost position to engage the projection 46 to stop the shutter and associated camera mechanism, and in its outermost or release position, will have no effect on the operation of the camera mechanism.

Mounted on the intermediate wall 22 by suitable means, as for example, spot welding, soldering, screws or the like, is a bracket member 50 which is provided with one or more tubular portions 51 adapted to receive and support a wire like member 52 having a portion 53, which is axially slidable in the portions 51, and partially rotatable therein. The upper end of the member 52, as viewed in FIGS. 2 and 3 terminates in a portion 54 extending substantially at right angles towards the wall 17, the latter having an elongated slot or opening 55 therein through which the portion 54 extends, with free end of the latter being inserted in a hole 57 in the member 48. Thus, as the member 52 is moved axially in the bracket 50, the member 48 may be reciprocated from an inoperative position to a shutter stopping position when the shoulder 49 is in the path of the projection 46.

Figure 3:
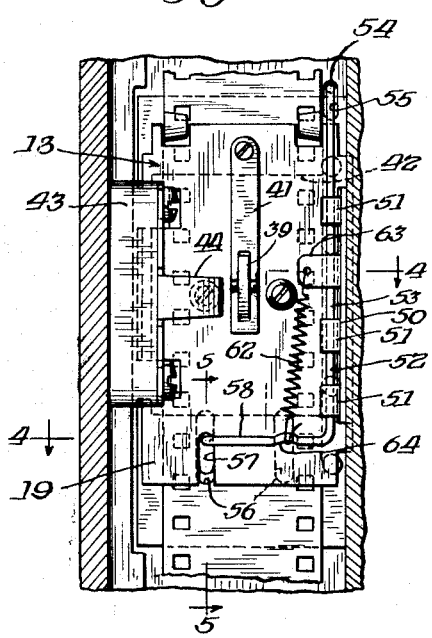
FIG. 3 is an elevational view, similar to FIG. 2 of the opposite side of the wall structure therein illustrated and showing the film gate of the camera.

Movement of the member 52 is adapted to be controlled by the film itself, the construction illustrated utilizing openings or slots in the film. In the particular embodiment of the invention involving double exposure tracks, four openings 56 are utilized, two adjacent each end of the film, each pair being disposed in parallel arrangement as illustrated in FIG. 3. The gate member 19 is provided with an opening 57 which is aligned with the path of one of the openings 56 whereby the latter may move into registry with the opening 57. As illustrated in FIGS. 3 and 4, the lower end of the member 52 is formed or bent transversely to provide a laterally extending portion 58 which is provided at its free with a transversely extending portion 59 extending through the opening 57 into engagement with a film strip F, and adapted to extend through an opening 56 when such an opening is in registry with the slot 57. As illustrated in FIG. 4 to 7, the wall 17 may be provided with a recess 61 in alignment with the slot 57 when the gate member 19 is in a closed position, in which the extreme end of the portion 59 may extend.

Suitable means may be provided for maintaining the latch member 48 in a normally inoperative position, such means in the embodiment of the invention illustrated comprising a tension spring 62, one end of which is secured to a lug or ear 63 formed on the bracket 50 with the opposite end being engaged with the portion 58 of the member 52, the latter being illustrated as having a slight offset 64 thereat to retain such spring in position.

Referring to FIGS. 5, 6, 7 and 8, the operation of the structure thus far described will be apparent. The operator may load the camera in the usual manner, opening of the cover 3 permitting the gate mechanism 18 to swing into an open position, such movement also springing the member 52 away from the wall 17 to permit free insertion of a film into the gate between the member 19 and the wall 17. Upon closure of the cover 3, the gate member 19 will be moved to the position illustrated in FIG. 4 and the end of the portion 59 of the member 52 will engage the film in the manner illustrated in FIG. 7, such end of the portion 59 being rounded as indicated at 65. The member 52 will be moved to its upward position as illustrated in FIG. 7 by the spring 62, thus maintaining the member 48 in its inoperative position. Following loading, upon actuation of the button 13 to the "down" or movie taking position, the projection 37 of the member 28 will be moved downwardly as viewed in FIGS. 2 and 8 out of engagement with the projection 26 permitting the shutter 23 to rotate. When the end of the "leader" portion of the film is reached, the openings 56 therein will pass through the gate 18 and upon the same reaching the slot 57 in the gate member 19, the portion 59 of the member 52 will pass therethrough into the recess 61, as illustrated in FIG. 5. Upon the trailing end edge 56 engaging the portion 59, it will move the latter and with it the members 52 and 48 in a downward direction as viewed in FIGS. 5 to 7 until the shoulder 49 of the member 48 is in the path of the projection 46 on the shutter, engagement therebetween stopping the latter and the advancing mechanism, independently of the control member 28 and button 13.

Various types of releasing means can be employed to return the latch member 48 to an inoperative position and thereby return the operational control of the camera to the button 13.

One very simple form of release is to provide a manual button or lever operatively connected to the latching mechanism and by means of which the member 48 may be manually moved to an "off" or inoperative position. For example, such a release member could be connected directly to the member 48, and comprise a small pin or knob 6 extending through an elongated opening 67 in the wall of 7 of the camera, and could be provided with an abutment at either side, similar to those illustrated adjacent the button 13 and commonly used in connection with such type of operating members. Thus when the shutter is stopped by the member 48, the free end of the pin extending from the wall 7 may be moved upwardly to move the member 48 to an inoperative position.

Referring to FIGS. 5, 6 and 7, it will be noted that the recess 61 is provided with an inclined bottom wall 68 operative to cam the portion 59 of the member 52 in a disengaging direction with respect to the film strip F. It will be apparent that the movement of the members 52 and 48 requires very little force, merely that required to overcome the tension of the spring 62, which in turn is merely sufficient to overcome frictional losses etc. and insure proper retention of the parts in inoperative relation until actuated by the film strip. Consequently the members will offer little resistance to the film movement.

Similarly, the member 52 may be constructed of spring wire such as piano wire having a stiffness sufficient to insure proper actuation of the member 48 but at the same time providing some degree of resilience, particularly in the portion 58 to provide a slight torsion spring action which would urge the portion 59 of the member 52 toward the film F, such resilience merely being sufficient to insure that such portion will drop into the recess 61 a sufficient distance to provide a firm interlock between the film and such portion whereby the desired stopping action will take place. The movement of the member 52 will terminate with the end 65 approximately at or near the top of the inclined portion 68 so that the mechanism will assume the approximate position illustrated in FIG. 6. As previously mentioned, the end 65 of the portion 59 may be rounded or tapered slightly so that when the elements are in the approximate position illustrated in FIG. 6, upon movement of the latch member 48 to an inoperative position, two things will occur, first—the portion 49 of the member 48 will disengage from the projection 46 on the shutter to permit the advancing mechanism to start so that the film will start to move downwardly as viewed in FIG. 6 and at the same time pressure will be applied to the portion 59 tending to move it upwardly with the latch member 48 with the rounded surface tending to cam the portion 59 out of engagement with the edge of the film at the aperture 56. Also, as the member 52 has some inherent resiliency, the portions 58 and 59 may give to rock the portion 59 about its engagement with the film in a counterclockwise direction as viewed in FIG. 6, so that this action would also tend to cam the portion 59 of member 52 out of operative engagement with the aperture 56.

While the releasing of the member 48 may be accomplished in the manner heretofore described through individual manually operated means such as the pin 67, such operation may also be accomplished through the camera control member 28 and button 13, such a construction being illustrated in FIGS. 2, 3 and 8, in which case the member 67 may be omitted.

Referring to FIG. 8, the member 48 may be operatively connected to the actuating lever 28 by a connecting link 69 having suitable means such as pins 71 and 72 at its respective ends adapted to be operatively engaged with the members 48 and 28 respectively. Thus the pin 71 may be constructed for insertion in an aperture 73 in the member 48, the latter in the construction illustrated being provided with a recessed or insert face 74 adapted to receive the adjacent end portion of the link 69, whereby the outer surface of the latter will be substantially flush with the corresponding faces of the members 48 and 17. In like manner, the lever 28 is provided with a notch or channel 75 therein, of a size to receive the adjacent end portion of the link 69, with the bottom wall of said recess having an elongated slot 76 therein adapted to receive the pin 72.

Referring to FIGS. 2 and 8, it will be apparent that when the member 48 and link 69 are in their upper, inoperative positions, the pin 72 will fall in approximately the center of the slot 76, thereby permitting the lever 28 to be manually moved by means of the button 13 to either single frame operation or movie operation without transmitting movement to the pin 72 or the structure associated therewith. However, when the lever 28 is in a "down" position, thereby permitting the shutter and advancing mechanism to run continuously, the upper end of the elongated slot 76 will be adjacent the pin 72. Upon one of the apertures 56 passing the portion 59 of the member 52 permitting operative engagement therebetween, the latch member 48 will be moved downwardly and with it the link 69 and upon engagement of the projection 46 with the shoulder 49 of the member 48, a stoppage of the shutter and advancing mechanism will be effected and in such position of the member 48, the pin 72 of the link 69 will be positioned adjacent the bottom of the slot 76 so that upon release of the button 13, permitting the lever 28, under the action of spring 33, to return to its neutral or "off" position illustrated in FIG. 2, the engagement of the lower end of the slot 76 with the pin 72 will transmit movement from the member 28 to the link 69 and thus to the latch member 48, such movement resulting in disengagement of the portion 59 of the member 52 with the aperture 56 in the film and permitting the member 52 to return, under the action of the spring 62 to the position illustrated in FIG. 7, returning the latch member 48 and link 69 to the positions illustrated in FIG. 2.

Thus, in utilizing this construction, the operator merely loads the camera in the manner heretofore described, following which the button 13 is moved downwardly to the "movie taking" position thereby advancing the film, and when the end of the leader portion of the film has been reached, an opening 56 will be positioned opposite the portion 59 with the action heretofore described resulting in a stopping of the film advance. The operator then merely releases the button 13 to permit the lever 28 to resume its "off" position resulting in an automatic re-setting of the latch member 48, whereby the advance is again under the sole control of the button 13. The same action will take place when all of the film to be exposed has been completed, and again by release of the button 13 the member 48 may be disengaged.

It will be apparent from the above description that the present invention enables the movie operator to shoot all of the exposable portion of the film strip, the operator knowing immediately when the beginning leader portion of the film has been run off, as well as knowing immediately when the end of the exposable portion is reached. Consequently, there is no danger of the operator initially running off an unnecessary amount of film thereby reducing the amount of exposable film or in running the film beyond the end of the exposable portion so that upon development it is found that some scenes or sequences which were believed to have been taken, actually were not, as they were shot after the end of the exposable portion of the film has been reached. Usually it is not apparent that the end of the reel has been reached until the free end of the leader at that end of the film has been reached, in which case usually scenes have been taken during the time the leader was running through the gate.

While the construction illustrated employs a lost motion connection between the lever 28 and link 69, obviously the construction could be reversed with the lost motion connection between the link 69 and the latch member 48.

FIG. 9 illustrates a modification of the form of the invention illustrated in the other figures with the chief difference being that the member 52' corresponding to the member 52 is operatively mounted on and carried by the film gate 18' rather than on the intermediate wall 22 of the camera. In this construction, the portion 58' of the member 52', corresponding to the portion 58 of the construction illustrated in FIG. 8 is positioned at the opposite end of the member adjacent the portion 54 and the portion 59 and main body of the member 52' lie in substantially a common plane. The bracket 50' is illustrated as being formed from a single piece of material formed to provide two spaced standards 51' having aligned openings or bores 77 therein through which the portion 53' of the member 52' extends, one of the standards 51' having means for attaching one end of the spring 62 thereto while the opposite end of the spring is operatively connected to a reversely bent portion 78 formed on the member 53' which portion may be so designed as to provide the desired spring action on the portion 59 to urge the latter toward the film. The bracket 50' may be secured to the gate 18' by any suitable means as, for example, a screw 79, the particular bracket illustrated also having a pair of indentations 81 therein operative to form projections on the underside of the bracket which may seat in recesses or openings in the upper surface of the gate 18' to lock the bracket with respect to pivotal movement about the screw 79.

The action of the construction illustrated in FIG. 9 is substantially identical with that previously described except for the derivation of the spring action on the portion 59. In this construction the member 52' has sufficient inherent resiliency to permit the very limited pivotal action of the film gate from closed to open position and vice versa.

While I have illustrated the openings 56 as being elongated and positioned in an intermediate portion of the film strip, in some cases it may be advantageous to utilize recesses or notches in the edge of the film which could, if desired, include one of the sprocket openings in which case the movement of the film engaging portion of the actuating member could be positioned adjacent the side edge of the film and movable laterally in substantially the plane of the film rather than transversely to such plane as is done in connection with the portion 59.

It will be apparent to those skilled in the art that in view of the various makes and types of cameras, a wide variation in the particular arrangement and shape of the elements of the mechanism for achieving the desired result may be necessary to adapt the invention to all of such cameras and that, at best, the present disclosure is merely illustrative. For example, the stopping action may be achieved at some other point with respect to the advancing and shutter mechnism and may even be incorporated with a portion of the actuating lever corresponding to the member 28 or the like.

It will also be apparent that while the invention had been illustrated in connection with a movie camera, the features of the invention could be readily adapted to still cameras and the like, either with a manual release similar to that heretofore described or in conjunction with other operating elements of the camera in a manner somewhat similar to the type of action achieved by the construction illustrated in FIG. 2.

Having thus described my invention, it will be obvious that various immaterial modifications may be made without departing from the spirit of my invention as defined in the claims; hence, I do not wish to be understood as limiting myself to the exact form, construction, arrangement and combination of parts herein shown and described or uses mentioned.

What I claim as new and desire to secure by letters patent is:

1. In an automatic film stopping mechanism for movie cameras including a film gate adapted to receive a film strip, a film advancing mechanism operatively associated with said film gate, a shutter mechanism operatively connected to and movable in syncronism with the film advancing means, and a movable manually actuated control member operatively connected to the advancing and shutter mechanisms for controlling the operation thereof with said control member having a film advancing position and a film stopping position, the combination of a film engaging member constructed for movement in the direction of advancing movement of a film strip positioned in said film gate and having a portion adapted to enter an opening in such a film strip and operatively engage the latter for movement therewith, resilient means operatively associated with said film engagement member opposing movement of the latter with such a film strip, a movable member operatively associated with said shutter and film advancing mechanisms and operative in one position to stop the operation of such mechanisms, means operatively connecting said last-mentioned member and said film engaging member whereby movement of the latter with the film is transmitted to said movable member to move the same to a mechanism stopping position and means operatively connecting said movable member and said manually actuated control member whereby movement of the latter from a film advancing position to a film stopping position is operable to move said movable member from a mechanism stopping position to a released position.

2. A film stopping mechanism as defined in claim 1 wherein said film engaging member is slidably mounted on the film gate.

3. A film stopping mechanism as defined in claim 1 wherein said film engaging member is slidably mounted on a fixed portion of the camera housing.

4. A film stopping mechanism as defined in claim 1 wherein said film engaging member is provided with a transversely extending U-shaped portion to which said resilient means is operatively connected.

5. A film stopping mechanism as defined in claim 1 wherein said means operatively connecting said movable and manually actuatable members includes a lost motion connection whereby said manually actuated member is operatively disconnected from said movable member when the latter is in a released position.

6. A film stopping mechanism as defined in claim 1 wherein said connecting means comprises a link operatively connected at its respective ends to said manually actuatable and movable members.

7. A film stopping mechanism as defined in claim 6, wherein said link is provided at one end with a pin positioned in an elongated slot in the adjacent member to provide a lost motion connection therebetween.

References Cited in the file of this patent

UNITED STATES PATENTS

| Number | Name | Date |
|---|---|---|
| 907,177 | Ries | Dec. 22, 1908 |
| 1,183,215 | Macdonald | May 16, 1916 |
| 1,367,268 | Kessler | Feb. 1, 1921 |
| 1,499,941 | Marette | July 1, 1924 |
| 1,557,334 | Roble | Oct. 13, 1925 |
| 1,698,106 | Owens | Jan. 8, 1929 |
| 1,764,066 | Chamberlain | June 17, 1930 |
| 2,091,508 | Howell | Aug. 31, 1937 |
| 2,505,965 | Holmes | May 2, 1950 |
| 2,624,231 | Kingston | Jan. 6, 1953 |
| 2,735,332 | Mihalyi | Feb. 21, 1956 |